United States Patent [19]

Sugihara et al.

[11] Patent Number: 4,764,917
[45] Date of Patent: Aug. 16, 1988

[54] AUTO LOADING DISK PLAYER

[75] Inventors: Masanori Sugihara; Kazuo Kobayashi; Akihiko Okamoto; Atsushi Kurosawa; Hideki Okii, all of Saitama, Japan

[73] Assignee: Pioneer Electronic Corporation, Tokyo, Japan

[21] Appl. No.: 878,155

[22] Filed: Jun. 25, 1986

[30] Foreign Application Priority Data

Jun. 26, 1985 [JP] Japan .............................. 60-98093[U]

[51] Int. Cl.$^4$ .......................... G11B 1/00; G11B 17/04
[52] U.S. Cl. .................................... 369/77.1; 369/75.1
[58] Field of Search ..................... 369/75.1, 75.2, 77.1, 369/77.2

[56] References Cited

U.S. PATENT DOCUMENTS 4,628,498 12/1986 Takamatsu et al. ............... 369/77.1

FOREIGN PATENT DOCUMENTS 145052 6/1985 European Pat. Off. .......... 369/75.2

Primary Examiner—Steven L. Stephan
Attorney, Agent, or Firm—Sughrue, Mion, Zinn, Macpeak & Seas

[57] ABSTRACT

A front loading disk player comprising a housing provided with a slot into which a disk to be played is inserted, a playback unit installed in said housing and a disk carrier mechanism for carrying said disk to a playback position. The disk carrier mechanism includes a disk loader. The playback unit comprises a carriage for supporting an optical pickup, a driving mechanism for driving the carriage, a turntable and a support member for supporting the carriage, the driving mechanism and the turntable. The support member is secured to the housing through a vibration-damping mechanism. A locking unit is provided for locking the support member to the housing when the disk is not played.

2 Claims, 16 Drawing Sheets

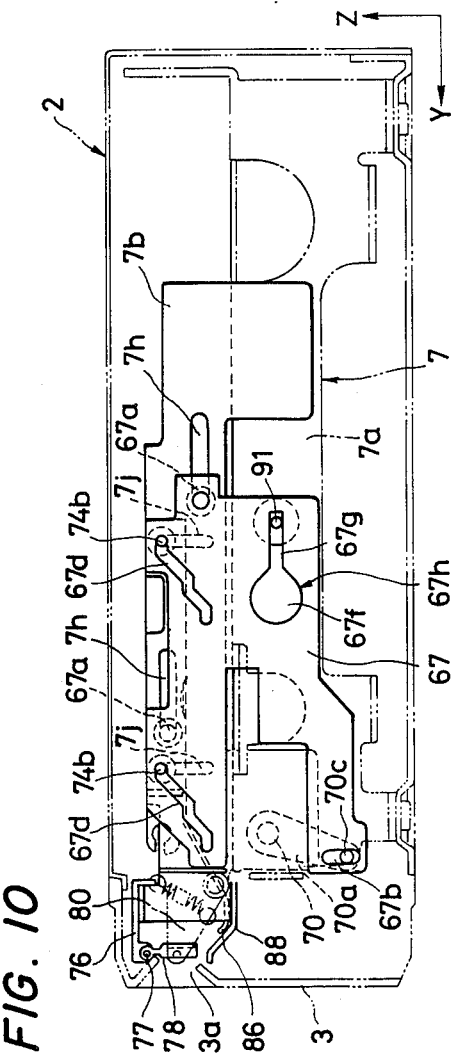

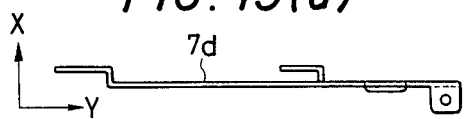
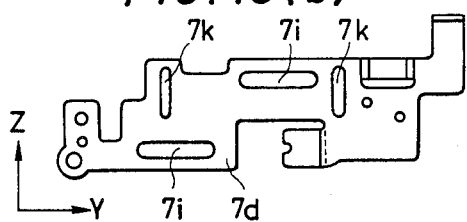
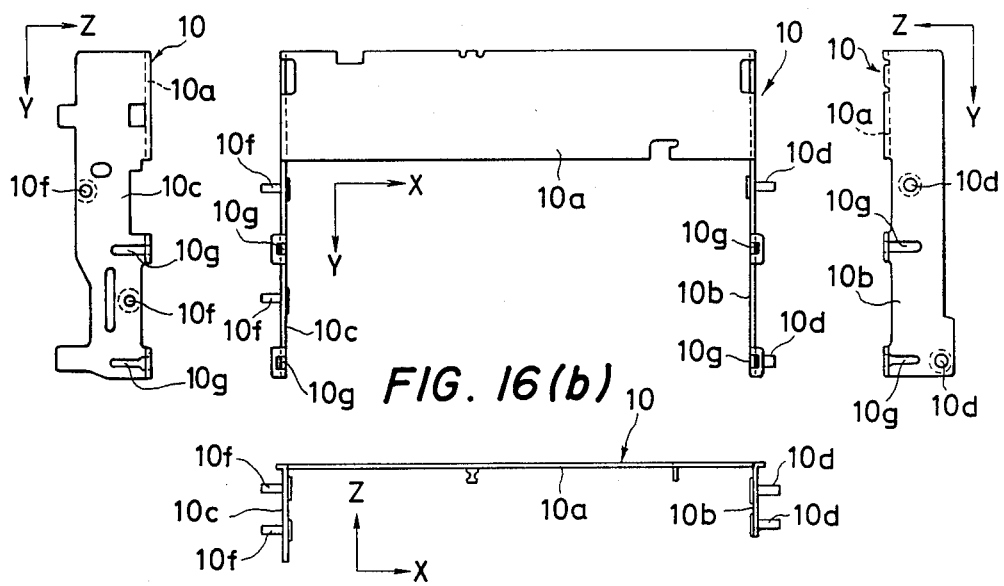
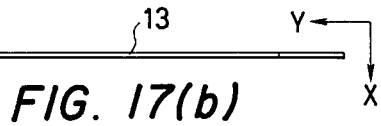
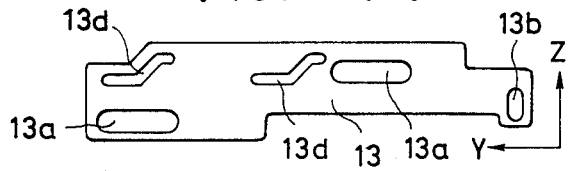

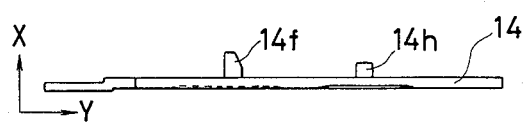
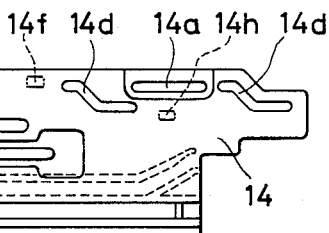
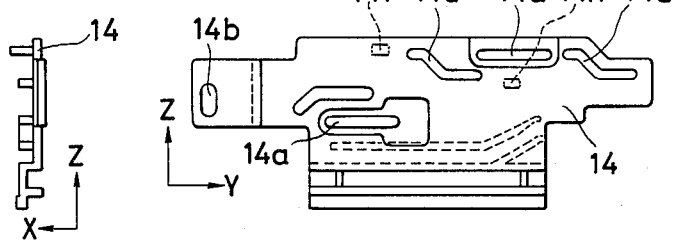
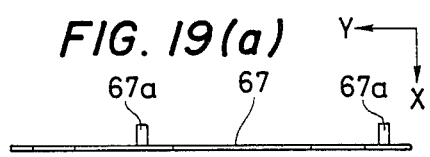
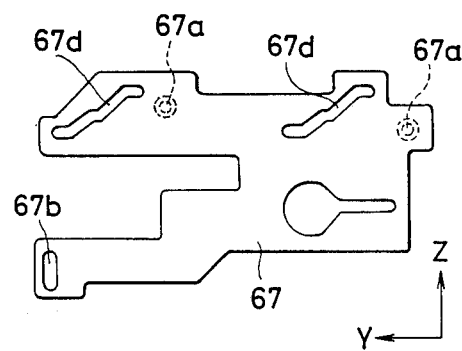
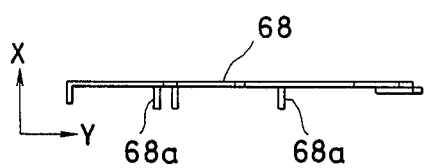
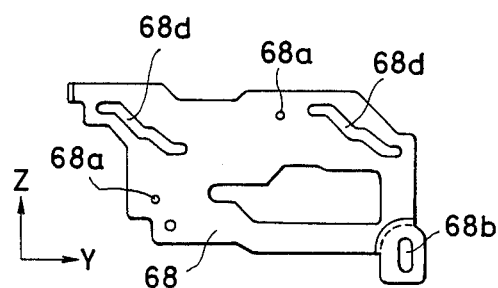
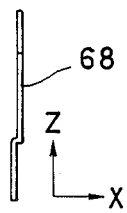

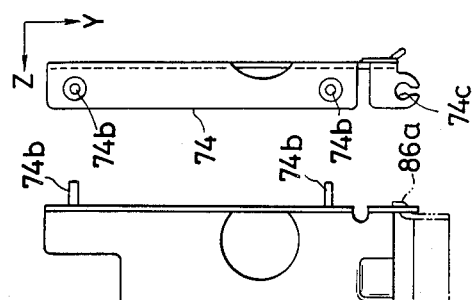
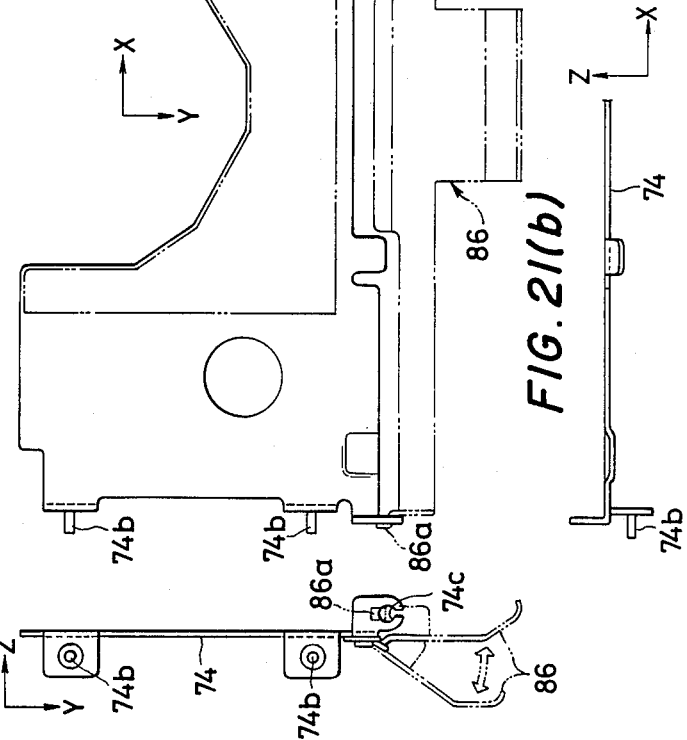
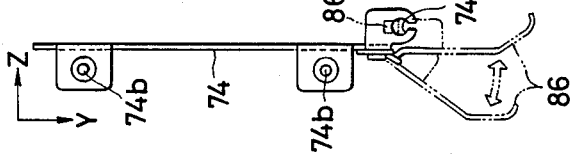

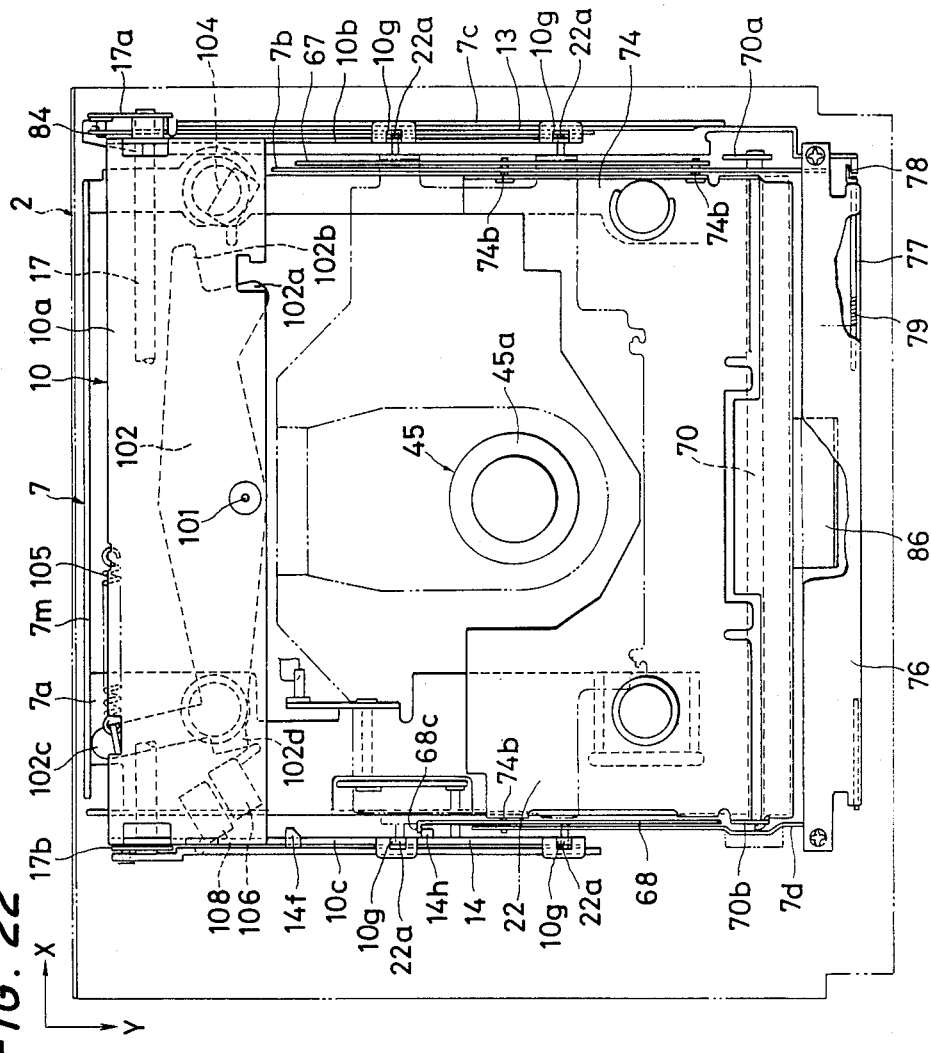

AUTO LOADING DISK PLAYER

BACKGROUND OF THE INVENTION

This invention relates to an auto loading disk player.

Auto loading disk players capable of saving the labor of disk loading for playing disks such as digital audio disks have been developed and diffused among general households to an appreciable degree. Such an auto loading disk player is equipped with a disk carrier mechanism for automatically carrying a disk onto a turntable. The disk is moved in two directions while being carried onto the turntable; namely, in the directions parallel and perpendicular to the face of the turntable.

Auto loading disc players of the sort suitable for outdoor use have also been developed and utilized recently. The requirements of disk players for outdoor use include easy disk loading, improved vibration resistant and dust-proof construction. In order to make disk loading easy, the so-called slot-in type is employed wherein it is only necessary to insert the disk into the slot formed in the player housing. With respect to vibration resistance, there have been made various contrivances. In existing auto loading disk players, it has been so arranged that playback means including pickup means and turntables in particular are protected from external small vibrations in such a manner that the playback means is mounted on a predetermined support member, which is further attached to the player housing through a vibration resistant mechanism. However, a relatively great shock may be applied to disk players, e.g., when they are shipped from manufacturers' plants and there is anxiety in that the support member supported by the vibration resistant mechanism with less rigidity is caused to move and sharply collides with the player housing.

SUMMARY OF THE INVENTION

An object of the present invention is to provide an auto loading disk player equipped with an excellent vibration resistant playback means.

The auto loading disk player according to the present invention is characterized by a support member loaded with a playback means including a turntable and the like and fixed to a player housing through a vibration-damping mechanism and a locking means for locking the support member to the player housing when the disk is not played.

BRIEF DESCRIPTION OF THE DRAWINGS

FIGS. 5 through 21 are detailed partial views of the internal construction thereof; and FIGS. 22 through 28 are diagrams for describing the operating of the auto-loading disk player.

DESCRIPTION OF THE PREFERRED EMBODIMENTS

Referring now to the accompanying drawings, an auto loading disk player embodying the present invention will be described.

Figure 1:
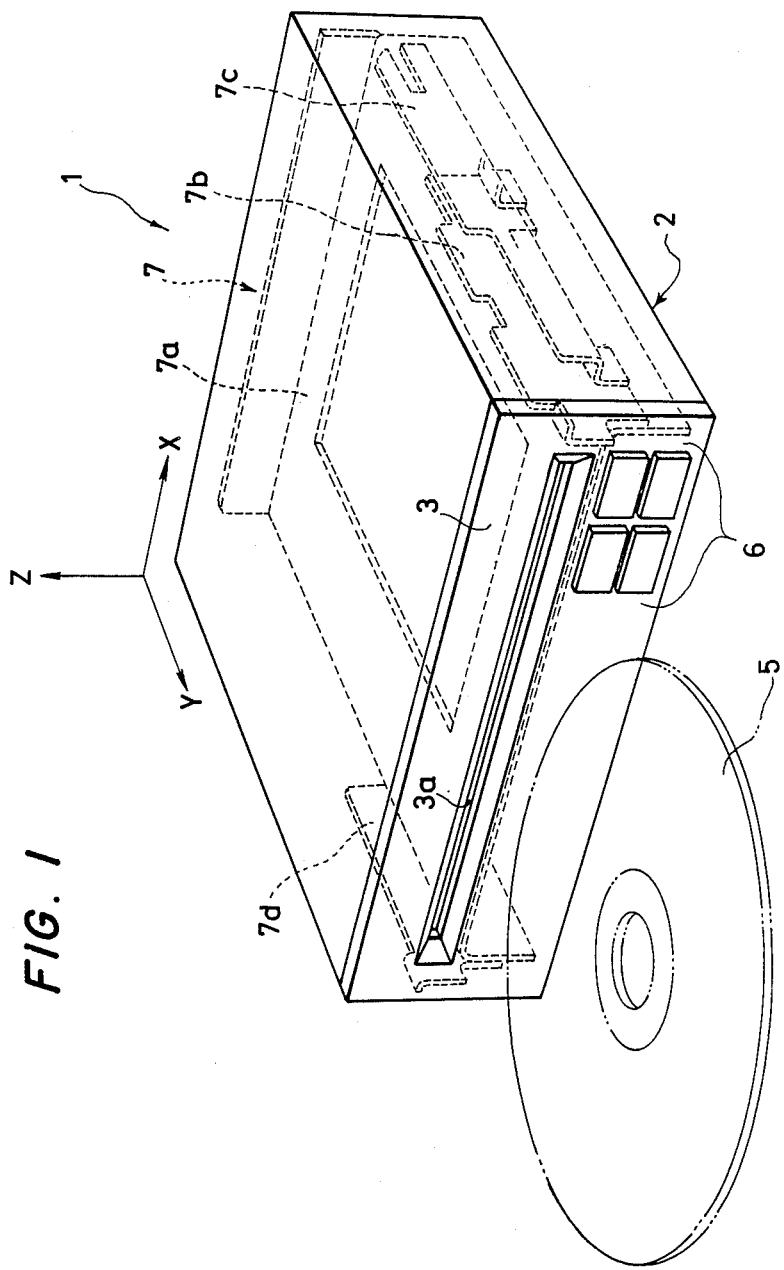
FIG. 1 is a schematic perspective view of an auto loading disk player embodying the present invention.

Numeral 1 designates the whole body of an auto loading disk player and, as shown in FIG. 1, a slot 3a horizontally extended for receiving a disk 5 to be played is provided in a front panel 3 forming part of a housing 2. Arrows X, Y and Z represent left, forward and upward directions, respectively. The disk 5, which is about 12 cm in diameter, employs a laser beam for recording and reading signals. There are also arranged a group of buttons 6 for operating the disk player, e.g., "play start", "disk eject", etc.

As shown in FIGS. 1 through 4, a chassis 7 is installed in the housing 2. The chassis 7 comprises a body 7a, two parallel chassis B7b, C7c to the left of the body and a subchassis D7d on the right front end of the body 7a. FIGS. 13(a) through 15(b) show each of the subchassis 7b, 7c and 7d in detail. On the chassis 7 is installed a tray 10 movable in parallel to, or in the longitudinal direction (the directions of arrow X and opposite thereto) of the disk loading face of a turntable, which will be described later. As shown in FIGS. 16(a) through (d), the tray 10 comprises a body 10a laterally extended (in the directions of arrow X and opposite thereto) and a pair of left and right sides 10b, 10c incorporated with the left and right ends of the body and extended in the forward direction (the direction of arrow V). The left side 10b of the tray 10 is supported in such a manner that pins 10d protruding from the left side are slidably fitted in a longitudinally extended opening in the subchassis 7c.

Figure 3:
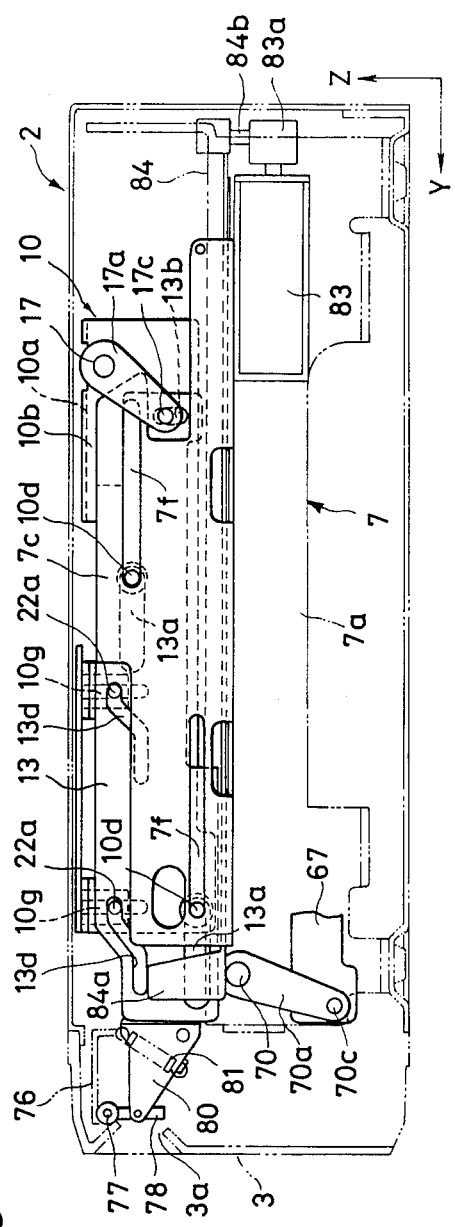
Figure 4:
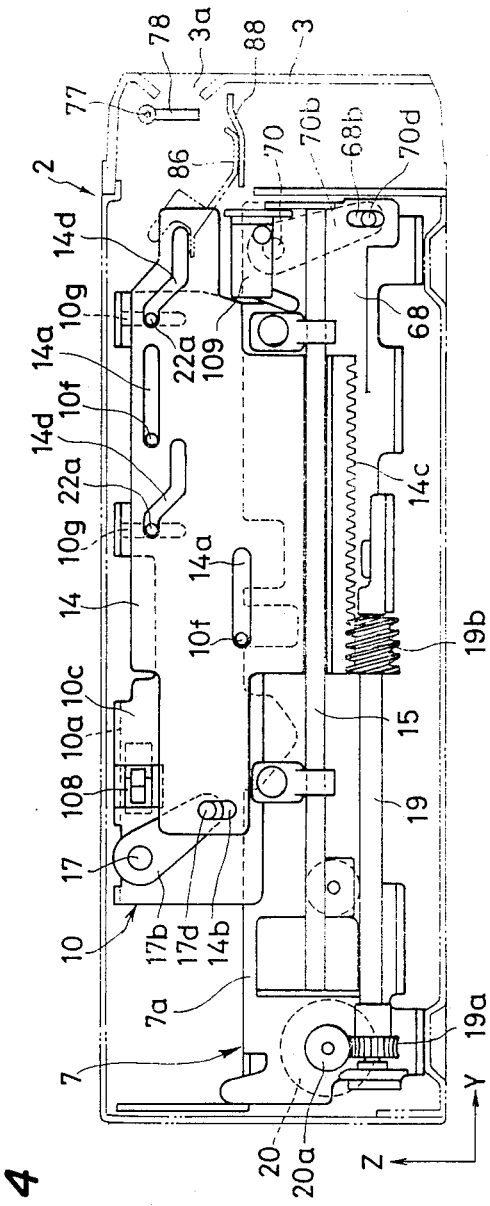

On the other hand, a pair of moving members 13, 14 are arranged on both lateral sides of the chassis 7. FIGS. 17(a), (b), 18(a), (b) show the moving members, 13, 14 in detail. The right moving member 14 is made of plastics and, as shown in FIG. 4, attached to the right side 10c of the tray 10 slidably supported by a guide shaft 15 fixed to the right end of the body 7a of the chassis 7 and extended in the moving direction, i.e., longitudinal direction of the tray 10 (directions of arrow Y and opposite thereto). More specifically, the moving member 14 is supported in such a manner that a pin 10f protruded from the right side 10c is slidably fitted in a longitudinally extended opening 14a of the moving member 14. The left moving member 13 is a steel plate arranged between the left side 10b of the tray 10 and the subchassis C7c and supported in such a manner that, as is shown in FIG. 3, the pin 10d protruded from the left side 10b is slidably fitted in a longitudinally extended opening 13a. An interlocking shaft 17 with arms 17a, 17b fixed thereto is laterally extended on both sides of the rear end of the tray 10 and movably attached to the tray 10. Pins 17c, 17d are respectively protruded from the tips of the arms 17a and 17b and slidably fitted in vertically extended openings 13b and 14b (in the directions of arrow Z and opposite thereto) at the rear ends of the moving members 13, 14. As shown in FIG. 4, a worm shaft 19 in the direction wherein the member 14 moves, i.e., longitudinally extended (in the directions of arrow V and opposited thereto) is rotatably installed under the right end of the chassis 7. A motor 20 is fixed to the right end of the chassis 7 and a worm 20a fixed into the output shaft of the motor engages with a worm wheel 19a fixed into the rear end of the worm shaft 19. Moreover, a worm 19b formed at the front end of the worm shaft 19 engages with a rack 14c formed in the longitudinal direction.

The interlocking shaft 17 including the arms 17a, 17b, the worm shaft 19 including the worm wheel 19a and the worm 19b and the motor 20 including the worm 20a constitute a means for providing the moving members 13, 14 with driving force.

Figure 2:
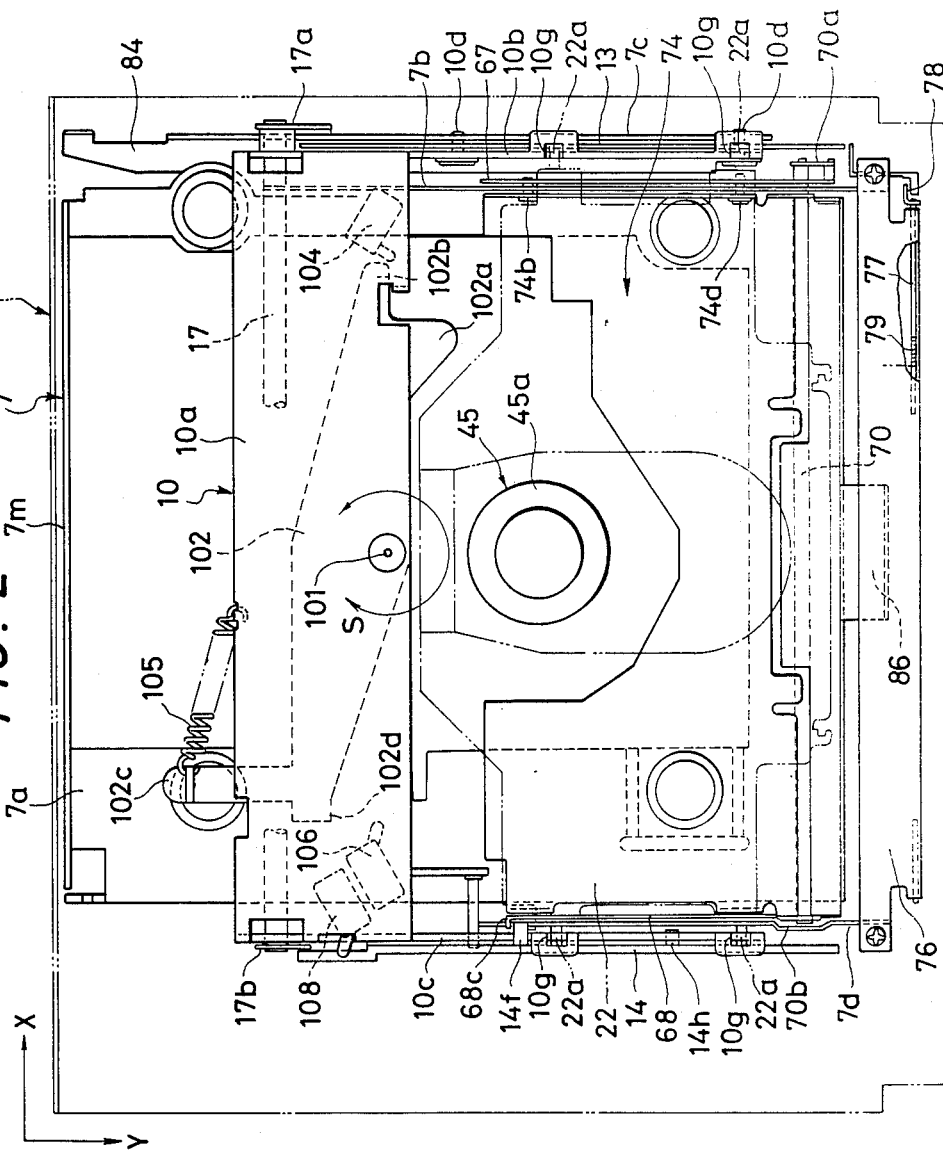
FIGS. 2 through 4 are respective plan, left and right side views of internal constructions thereof.
Figure 5:
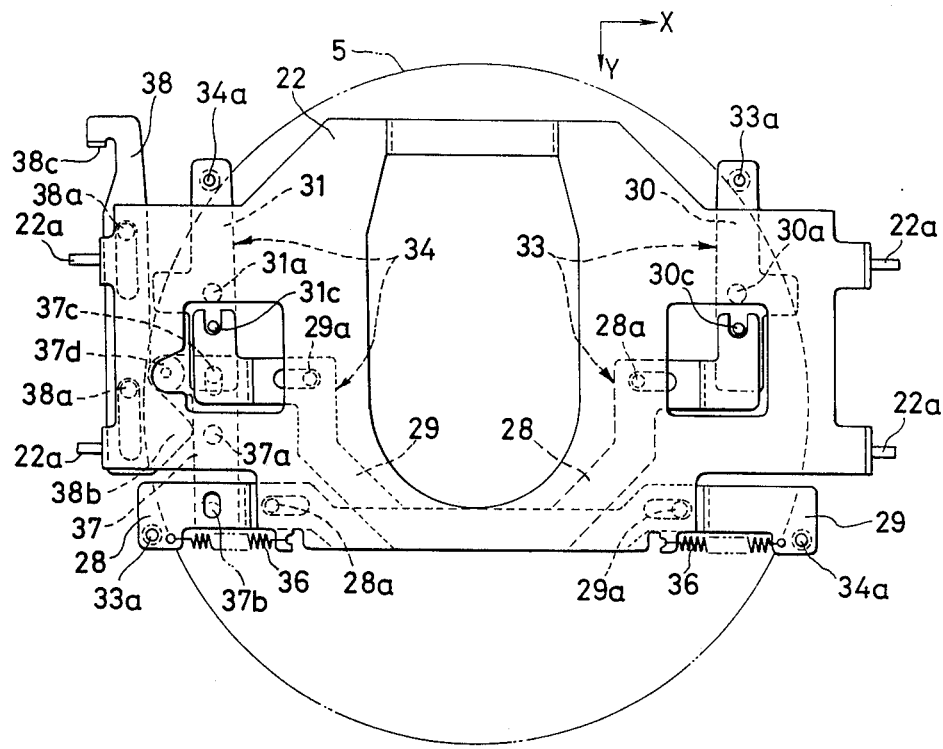

As shown in FIG. 2, a disk 5 loading container 22 is arranged between the left and right sides 10b, 10c of the tray, i.e., sandwiched between both moving members 13, 14. FIG. 5 is a detailed diagram of the container 22. The container 22, the tray 10 and the moving members 13, 14 constitute a disk loading means. Two pairs of, i.e., four pieces of pins 22a are laterally protruded from both left and right ends of the container 22. Since these pines 22a are slidably fitted in four vertically extended openings 10g (in the directions of arrow Z and opposited thereto) at both left and right ends 10b, 10c of the tray 10, respectively, the container 22 is vertically supported by the tray 10 and made movable within a fixed range in the direction perpendicular to the direction wherein the tray 10 moves. The pins 22a protruded from the container 22 are respectively passed through the vertically extended openings 10g before being slidably fitted in cam holes 13d, 14d formed in the moving members 13, 14. Each of the cam holes 13d, 14d is formed of a tapered portion tilted in the direction wherein the disk is inserted from the slot 3a, i.e., longitudinally tilted upward, i.e., in the direction wherein the container 22 is moving apart from the disk loading face of a turntable as will be described later; and two horizontal portions extending forward and rearward, the horizontal portions being contiguous to the front and rear ends of the tapered portion, respectively. In other words, the container 22 is so arranged as to move vertically as the moving members 13, 14 move longitudinally.

There is also provided a locking release means (not shown) for locking the container 22 to the tray 10 until the tray 10 reaches the position right above the turntable, i.e., the center of rotation of the disk loaded onto the container 22 roughly coincides with the rotating shaft of the turntable, releasing the tray 10 from the locked state to the container 22 and locking the tray 10 to the chassis 7.

A description will subsequently be given of a disk holding means for holding the disk 5 inserted from the slot 3a provided in the container 22 and properly positioning the disk 5 on the container 22.

As shown in FIG. 5, a pair of long plates 28, 29 are laterally arranged on the under surface of the container 22 and laterally movably (in the directions of arrow X and opposite thereto) attached thereto through pairs of pins 28a, 29a, respectively. A pair of short plates 30, 31 are laterally arranged on the rear sides of the long plates 28, 29 and movably attached to the container 22 through pins 30a, 31a, respectively. One ends of the short plates 30, 31, the front ends thereof in this case, are pivotally coupled to first ends of the long plates 28, 29 through pins 30c, 31c, respectively. The long plate 28 and the short plate 30 are referred to as a first holding member 33, whereas the long plate 29 and the short plate 31 are referred to as a second holding member 34. In other words, the pair of the holding members 33, 34 are arranged on both sides of a disk inserting passage and made movable on a plane almost parallel and relative to the main face of the container 22 (parallel to the disk loading face of the turntable as described later). Pairs of pins 33a, 34a are protruded downward (in the direction of arrow Z) in the fixed positions on the under surfaces of the holding members 33, 34, respectively. These pins 33a, 34a are extended in the direction perpendicular to the main face of the container 22 and used as means for mating with the outer periphery of the disk 5. Moreover, a pair of coil springs 36 energize both holding members 33, 34 in the directions wherein the pins 33a, 34a may be brought close to the outer periphery of the disk.

Figure 6:
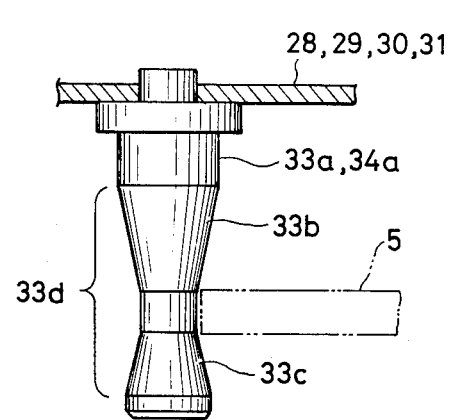

As shown in FIG. 6, each of the pins 33a (34a) has a first tapered portion 33b whose diameter is reduced toward the disk loading face of the turn table (described later), i.e., in the downward direction (of arrow Z) and a second tapered portion 33c whose diameter is increased in the downward direction, the second tapered portion 33c being contiguous to the first tapered portion 33b, whereas a drum-shaped tapered portion 33d mating with the outer periphery of the disk is also formed.

As shown in FIG. 5, the container 22 is provided with a synchronizing plate 37 for synchronously driving the first and second holding members 33, 34. More specifically, the synchronizing late 37 is rotatably attached to the container 22 through a pin 37a provided in its center and both front and rear ends thereof are pivotally attached to the first and second holding members 33, 34 through pins 37b, 37c. A roller 37d is fixed to the rear end of the synchronizing plate 37 and a triangular cam 38b of an intermediate lever 38 installed at the right end of the container 22 abuts on the roller, the intermediate lever 38 is capable of longitudinally reciprocating. (in the direction of arrow Y and opposite thereto) through a pair of pins 38a. In other words, the synchronizing plate 37 is swivelled by the reciprocating lever 38 and driven in the direction where the first and second holding members 33, 34 are consequently released from holding the disk 5. The intermediate lever 38 is moved back as the moving member 14 is caused to move back when the protrusion 14f of the moving member 14 mates with a bent portion 38c at the rear end of the lever 38 and returned to the forward position by the (above-described) coil spring 36.

The first and second holding members 33, 34, the coil spring 36 as an energizing means and the synchronizing plate 37 constitute the disk holding means for holding the disk 5 inserted from the slot 3a and properly positioning the disk 5 on the container 22. The disk holding means is included the above disk loading means (the tray 10, moving members 13, 14 and the container 22). Moreover, the disk loading means, the chassis 7 for movably supporting the disk loading means, the means for providing the moving members 13, 14 with driving force, that means including the motor 20, etc., peripheral small members related thereto constitute a disk carrier mechanism or carrying the disk 5 to the disk loading face of the turntable which will be described later.

The playback means for replaying the disk will then be described.

Figure 7:
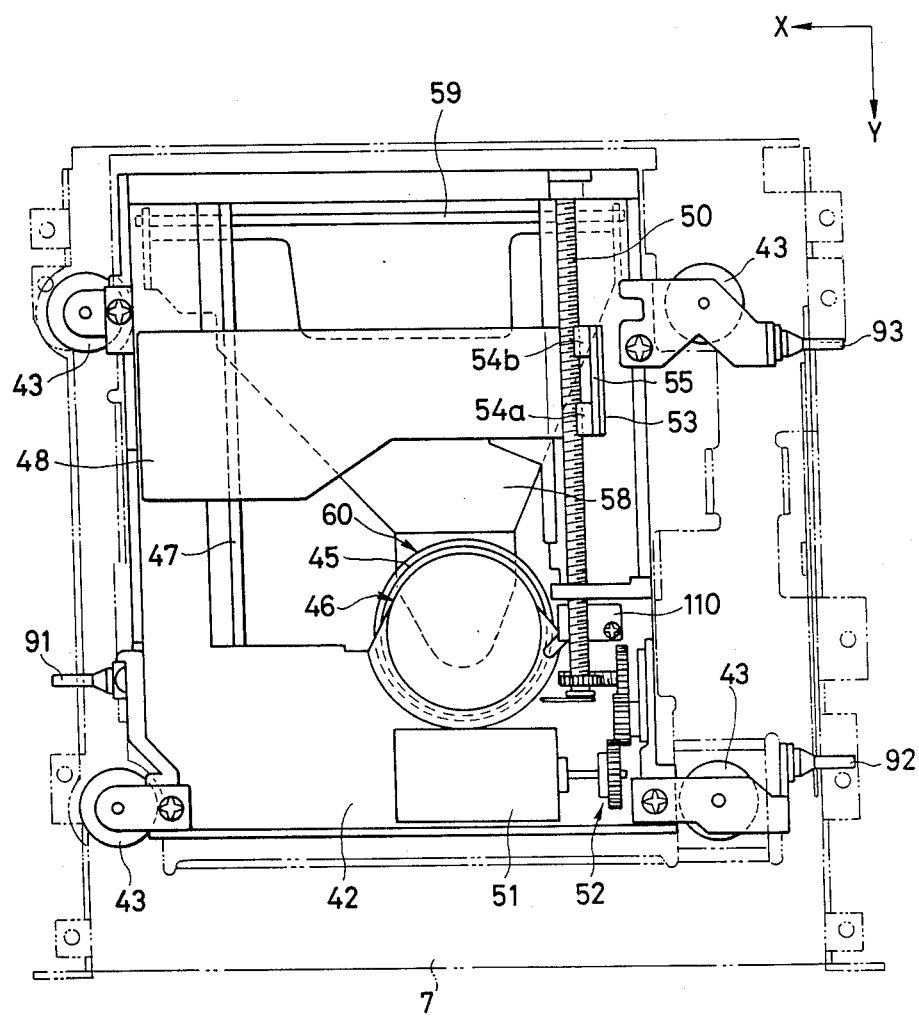

As shown in FIG. 7, a support member 42 in the form of a rectangular plate is arranged under the chassis 7 and attached to the under surface of the chassis 7 through a vibration resistant mechanism including four vibration resistant members 43 prepared from soft rubber and the like. The turntable 45 and a spindle rotor 46 as a driving source for directly driving the turntable are installed on the support member 42. The support member 42 is also equipped with guide shafts 47 extending in the direction parallel to the disk loading face 45a of the turntable 45 (see FIG. 8), i.e., in the longitudinal direction (direction of arrow Y and opposite thereto) and a carriage 48 loaded with an optical pickup means and guided by both guide shafts. A screw shaft 50 is arranged in parallel to the guide shaft 47 and rotatably attached to both ends of the support member 42. A motor 51 is arranged in front of the screw shaft 50, which is driven and rotated by the motor through a reduction mechanism 52 consisting of a plurality of toothed wheels. A rectangular leaf spring 53 in the form of a cantilever vertically extended is fixed to the right end of the carriage 48, whereas a pair of half nuts 54a, 54b installed a longitudinally fixed space apart are screwed in the screw shaft 50 at the free end of the leaf spring. However, both half nuts 54a, 54b are coupled together with a coupling member 55.

The screw shaft 50, the motor 51, the reduction mechanism 52, the leaf spring 53, the half nuts 54a, 54b and the relevant peripheral small members constitute the driving mechanism for driving the carriage 48. The driving mechanism, the support member 42, the turntable 45, the spindle motor 46, the guide shafts 47a, 47b and the carriage 48 constitute the playback means for replaying the disk.

Subsequently, a clamp mechanism for clamping the playback position, i.e., the disk 5 carried onto the disk loading face 45a of the turntable 45.

Figure 8:
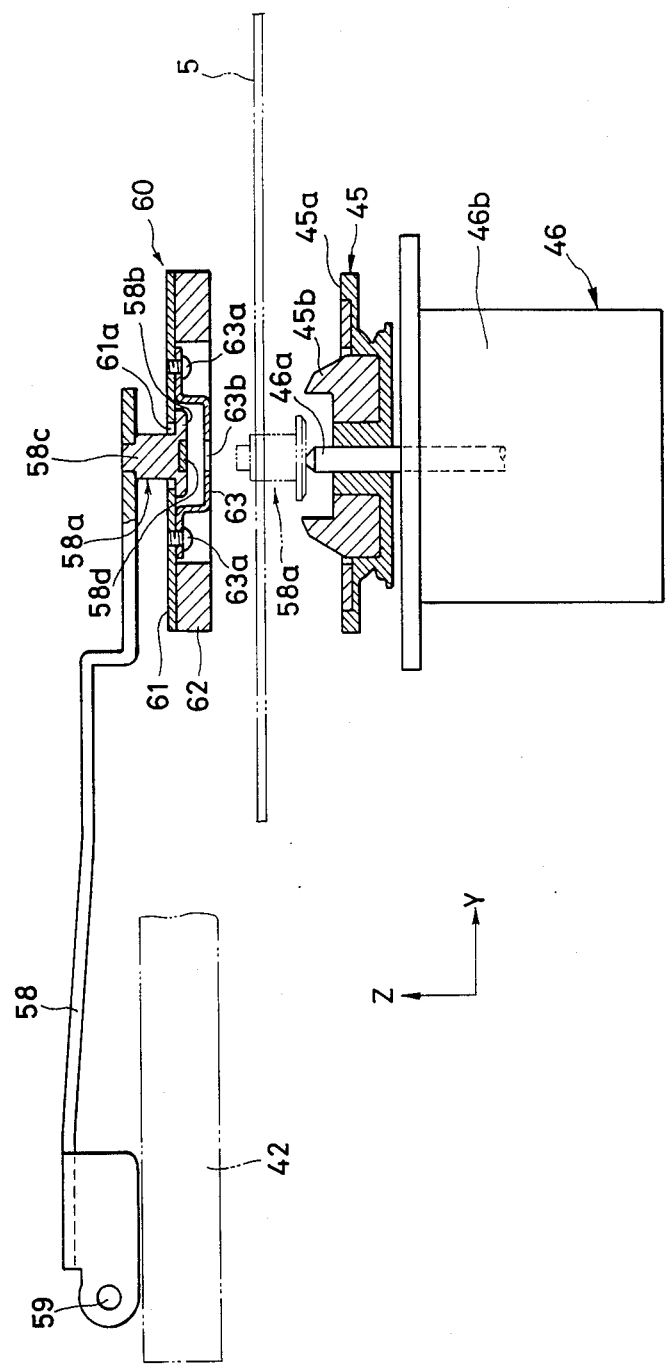
Figure 9:
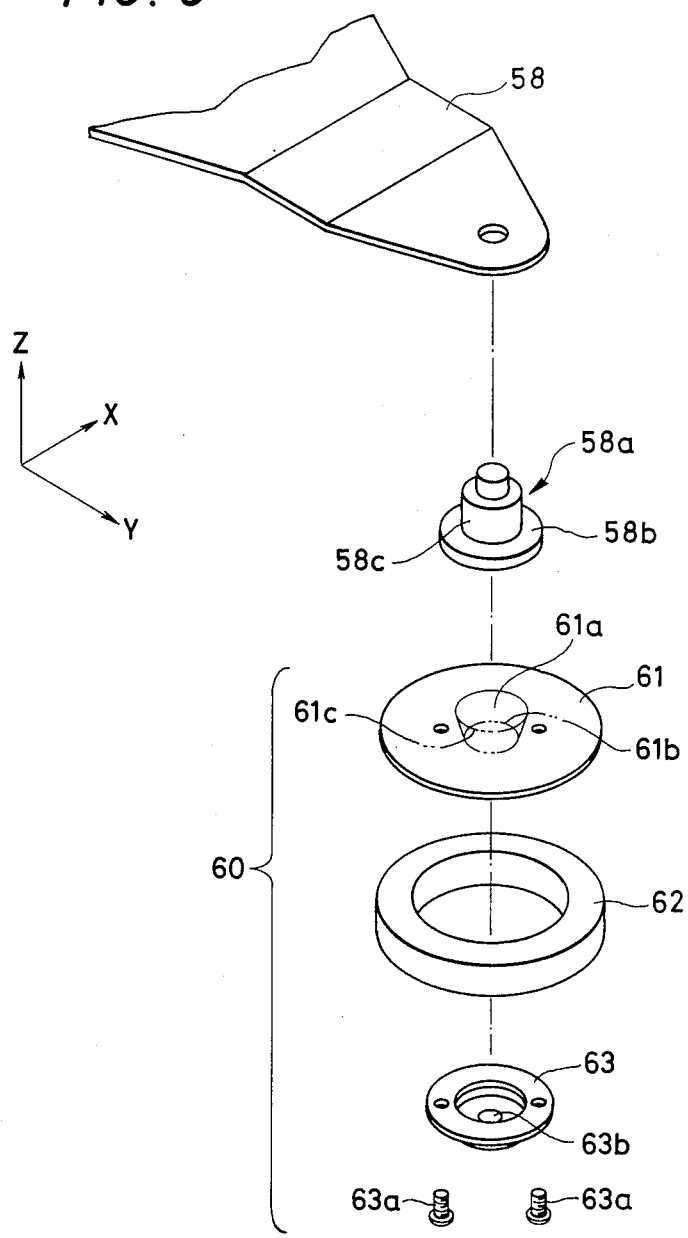

As shown in FIGS. 7 and 8, a triangular arm member 58 as a support member is arranged above the support member 42 installed on the chassis 7 and oscillatably attached to the support member 42 through a shaft 59 laterally extended (in the direction of arrow X and opposited thereto) at the rear end thereof. As also shown in FIG. 9, a discoidal presser member 60 for performing the disk clamp action in cooperation with the turntable 45 and by means of the magnetic force of a magnet is rotatably attached to the free end of the arm member 58, i.e., the front end thereof in this case. The position of the arm member 58 shown in FIG. 8 is called a non-clamped position. When the arm member 58 oscillates downward by a predetermined angle, thus causing the presser member 60 to abut on the surface of the disk 5 mounted on the turntable 45, the then position of the arm member is called a clamped position. The arm member 58 is allowed to move between the clamped and non-clamped positions relative to the turntable 45.

The arm member 58 is equipped with a columnar holder 58a at its free end. The holder 58a is provided with a large diameter discoidal portion 58b at its lower end and its upper end is caulked and fixed to the body of the arm member 58. On the other hand, the presser member 60 comprises a discoidal yoke 61 fitted in an opening 61a formed in the main face for being set in the body 58c of the holder 58a with play and rotatably attached to the holder, an annular magnet 62 concentrically coupled to the yoke 61 thereunder and an bowl-shaped positioning member 63 for positioning the yoke in such a manner that the center of rotation of the yoke 61 may coincide with rotating shaft of the holder 58a. However, the yoke 61 and the magnet 62 are joined with an adhesive, whereas the positioning member 63 and the yoke 61 are coupled with screws 63a. As shown in FIG. 9, the opening 61a formed in the yoke 61 to be set in the body 58c of the holder 58a with play is composed of a first circle 61b located in the center of rotation of the yoke, the first circle having a diameter slightly larger than the outer diameter of the body 58c and smaller than the outer diameter of the large diameter portion 58b of the holder 58a, a second circle 61c deflected from the center of rotation of the yoke, the second circle having a diameter larger than the outer diameter of the large diameter portion 58b and a connecting portion for connection the first and second circles, the connecting portion being wider than the outer diameter of the body 58c.

The arm member 58 and the shaft 59 and the presser member 60 constitute the clamp mechanism for clamping the disk 5 carried onto the turntable 45.

As shown in FIG. 8, the spindle motor 46 for driving and rotating the turntable 45 has a spindle 46a coupled to the turntable 45 and the spindle is rotatably supported by a bearing (not shown) contained in the body 46b of the spindle motor 46. When the arm member 58 is located in the above clamped position, the lower end of the holder 58a forming part of the arm member is caused to mate with the front end of the spindle 46a so as to press the spindle against the bearing (not shown), i.e., press the spindle downward. In consequence, an opening for allowing the spindle to pass therethrough is formed in the bottom of the bowl-shaped positioning member 63 constituting the presser member 60. A discoidal receiving member 58d prepared from resin for smoothing the mating condition is provided in the portion where the holder 58a mates with the spindle 46a. Moreover, the turntable 45 is provided with a guide member 45b fitted in the center hole of the disk 5 so as to guide the disk to the center of rotation of the turntable.

The assembly of the clamped mechanism will be described briefly.

The holder 58a as part of the arm member 58 is precaulked and fixed to the arm member first. Apart from the above procedure, the discoidal yoke 61 and the annular magnet 62 are joined with an adhesive. The large diameter portion 58b of the holder 58a is passed through the second circle 61c shown in FIG. 9 out of the opening 61a formed in the yoke 61 and subsequently the body 58c of the holder 58a is so arranged as to be positioned within the first circle 61b. The positioning member 63 is attached to the yoke 61 in that state with the screws 63a. The holder 58a and the yoke 61 (and the magnet 62) are almost concentrically positioned. The assembly of the clamp mechanism is thus completed. The clamp mechanism is actuated by the movement of the member 14.

As shown in FIGS. 2, 10 and 11, a moving plate 67 is installed to the left of the left subchassis B7b and made movable in the longitudinal direction (the directions of arrow Y and opposite thereto) and another moving plate 68 is installed to the left of the right subchassis D7d and made movable in the longitudinal direction. FIGS. 19(a), (b), 20(a), (b) are detailed views of the moving plates 67, 68. More specifically, the moving plates 67, 68 are supported in such a manner that pins 67a, 68a protruded therefrom are slidably fitted in pairs of longitudinally extended holes of the subchassis B7b, D7d, respectively. A laterally extended interlocking shaft 70 with arms 70a, 70b fixed at both ends thereof is arranged at the front end of the chassis 7 and rotatably attached thereto. Pins 70c, 70d are respectively protruded from the front ends of the arms 70a, 70b and slidably fitted in vertically extended openings 67b, 68b (in the directions of arrow Z and opposite thereto) at the front ends of the moving plates 67, 68. In other words, as one moving plate 68 moves, the other moving plate 67 also reciprocates. The moving plate 68 is moved back when the protrusion 14h (see FIGS. 2 and 18) of the moving member 14 mates with a bent portion 68c (see FIG. 2) at the rear end of the moving plate, thus causing the moving member 11 to move back. The moving pltes 67, 68 are returned to the forward position by the energizing force of a coil spring 72 (see FIG. 11) coupled to the moving plate 68.

As shown in FIG. 22, a flat guide member 74 for guiding the disk 5 to the position right under the container 22 with its surface slidably contacting the main face of disk inserted from the slot 3a formed in the housing is arranged in the position between the pair of moving plates 67, 68. FIGS. 21(a) through (d) are detailed views of the guide member 74. Felt 74a (see FIG. 21(a)) is adhesion-bonded on the surface of the guide member 74 and the portion making contact with the main face of the disk 5. As shown in FIG. 21(a), pairs of laterally extended pins 74b, i.e., four pieces of them, are respectively provided at both left and right ends of the guide member 74. The guide member 74 is supported and made vertically movable within a fixed range as the result of which the pins 74b are slidably fitted in pairs of vertically extended openings 7j, 7k (in the directions of arrow Z and opposite thereto) of the subchassis B7b, D7d. The pins 74b protruded from the guide member 74 are fitted in the vertically extended openings 7j, 7k of the subchassis B7b, D7d and moreover slidably fitted in the cam holes 67d, 68d formed in the moving plates 67, 68, respectively. The cam holes 67d, 68d as a whole are tilted upward from the forward direction to the rear direction (the direction opposite to arrow Y). In other words, the guide member 74 is vertically moved as the moving plates 67, 68 longitudinally move.

Figure 12:
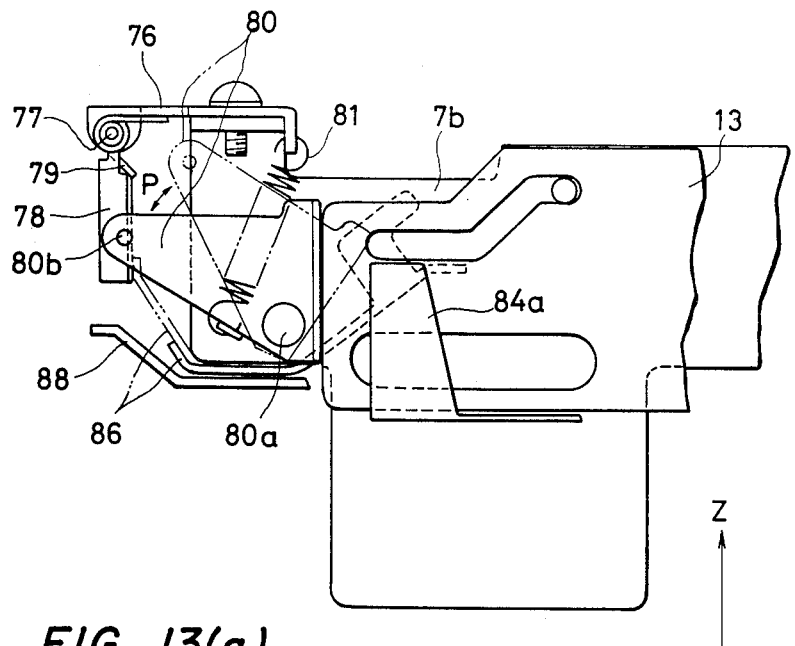
Figure 13A:
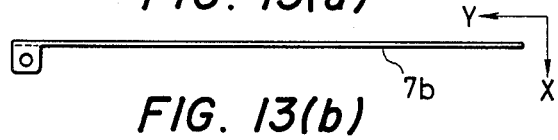
Figure 13B:
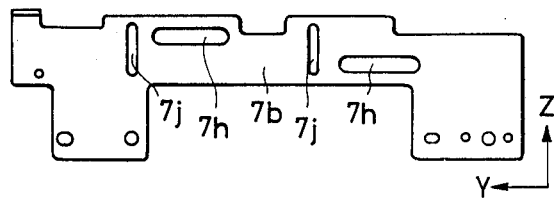
Figure 14A:
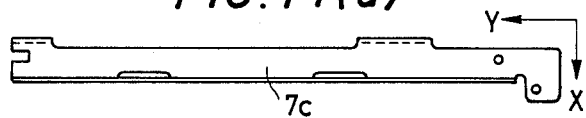
Figure 14B:
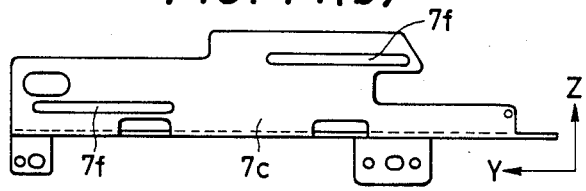

As shown in FIG. 22, a bracket 76 is installed between the front ends of the subchassis B7b, D7d. As shown in FIGS. 3, 12, for instance, the lower portion of the bracket 76 is provided with a shaft 77 laterally extended (in the directions of arrow X and opposite thereto) and a cover 78 for covering the slot 3a is oscillatably installed at the upper end of the shaft. The cover 78 is energized by a spring member 79 fitted onto the shaft 77 toward the position where the slot 3a is covered.

As is obvious from FIG. 12, a swivel lever 80 is attached to the front end of the subchassis B7b through a pin 80a and made rotatable in the direction of arrow P. The swivel lever 80 has a pin 80b at its free end and the pin 80b abutting on the front face of the cover 78 is used to oscillate the cover 78 toward an opening position. The swivel lever 80 is energized clockwise by a coil spring 81 shown in FIG. 12. As also shown in FIG. 12, the front end of the moving member 13 is allowed to abut on the free end of the swivel lever 80 as described above. When the moving member 13 is moved back (in the direction opposite to arrow Y), the swivel lever 80 is swivelled clockwise (in FIG. 12) by the coil spring 81, whereby the cover 78 moves towards the opening position. When the moving member 13 is located in the forward marginal position for movement (the position shown in FIG. 12), the swivel lever 80 is swivelled counterclockwise by the moving member and the cover 78 energized by the spring member 79 is returned to the closing position. In other words, the cover 78 is held in the closing or opening position by the (above described) disk carrier mechanism including the moving member 13. The swivel lever 80 including the spring member 79 and the pin 80a and the coil spring 81 both are included in the disk carrier mechanism.

As shown in FIG. 3, a solenoid 83 is fixed to the rear end of the subchassis C7c and used to temporarily move the cover 78 to the closing position. As specifically shown in FIG. 3, a longitudinally extended lever member 84 is arranged along the whole length of the subchassis C7c and attached to the subchassis C7c in such a manner as to reciprocate in the longitudinal direction. A means 84a for abutting the free end of the swivel lever 80 from behind is formed at the front end of the lever member 84. Moreover, the rear end of the lever member 84 is coupled to the plunger 83a of the solenoid 83 by a pin 84d; i.e., the lever member 84 is caused to move forth as the result of which the plunger 83a of the solenoid 83 is retracted. Consequently, the abutting means 84a of the lever member makes the swivel lever 80 (in FIGS. 3 and 12) swivel counterclockwise, thus causing the cover 78 to move to the closing position.

As shown in FIGS. 10, 12, 21(a) and (d), a member 86 for preventing double disk insertion from the slot 3a of the housing 2 is installed at the front end of the guide member 74. The member 86 for preventing double disk insertion is capable of moving from the (insertion) preventive position shown by an alternate long and two short dashes line in FIG. 12 and the non-preventive position shown by an actual line. As shown in FIGS. 21(a) and (d), the small bent portions 86a is formed at both left and right ends of the member 86 for preventing disk insertion and the bent portions 86a are smoothly fitted in circular opening 74c formed at the left and right ends of the guide member 74. (Consequently, the member 86 for preventing disk insertion is capable of oscillating with the bent portions 86a as the pivoting center and thus moving between the preventive and non-preventive positions.

As shown in FIG. 12, a tongue piece 88 fixed to the chassis 7 is located under the member 86 for preventing disk insertion. Although the member 86 for preventing disk insertion vertically moves together with the guide member 74, it is oscillated centering around the bent portions 86a (see FIG. 21) while being vertically moved and pressed against the tongue piece 88, and moved between the preventive and non-preventive positions. The flat guide member 74 is driven by the disk carrier mechanism and accordingly the member 86 for preventing disk insertion is moved by the disk carrier mechanism.

The cover 78 is moved when the member 86 for preventing disk insertion is present in the non-preventive position. Consequently, it becomes unnecessary to provide a cut in the cover 78 so as to avoid collision with the member 86 for preventing disk insertion.

A locking means for locking the support member 42 (for supporting playback means including the turntable 45, etc.) to the housing 2, i.e., the chassis 7 in this case, when the disk is not replayed will subsequently be described.

As shown in FIG. 7, the support member 42 is provided with three lock pins 91, 92, 93; namely, one on the left side and two in the right side, each lock pin being laterally extended.

On the other hand, as shown in FIG. 10, an opening 67h comprising a circular portion 67f and a straight line portion 67g contiguous to the rear end of the circular portion is formed in the lower rear end portion of the moving plate 67 arranged on the left-hand side of the chassis 7, whreby the lock pin 91 is fitted in the opening 67h. When the lock pin 91 is fitted in the straight line portion 67g of the opening 67h, the lock pin is locked to the moving plate 67, thus the chassis 7 and, when the lock pin 91 is fitted in the circular portion 67f, the locked state is released.

As shown in FIG. 11, a laterally extended pin 95 is protruded from the right-hand side of the chassis 7 (in the directions of arrow X and opposite thereto) and the roughly center of a longitudinal lock plate A96 is attached to the pin, the lock plate being made rotatable in the direction of arrow Q. A coil spring 97 is coupled to the lock plate A96, which is driven clockwise in FIG. 11 by the coil spring. As the lock plate A96 swivels counterclockwise, the lock pin 92 mates with the front end of the lock plate A96, so that a cut 96a for locking the lock pin 92 is formed. A cam 96c is formed in the neighborhood of the rear end of the lock plate A96 and a pin 68f protruded from the moving plate 68 arrange to the right of the chassis 7 is made to slidably mate with the cam 96c; i.e., the lock plate A96 is caused to swivel by the movement of the pin 68f along the cam 96c as the moving plate 68 longitudinally moves and the action of the coil spring 97.

A roughly crescent lock plate B99 is arranged at the rear end of the lock plate A96 and attached to the chassis 7 through a pin 99a and made oscillatable in the direction of arrow R. The lock plate B99 is caused to mate with the lock pin 93 so as to lock the lock pin to the chassis 7, with its free end pivotally connected to the rear end of the lock plate A96 through a pin 99b, and oscillate as the lock plate A96 swivels.

The lock pins 91, 92, 93, the moving plate 67, the lock plate A96, the coil spring 97, the lock plate B99 and relevant peripheral small members constitute the locking means for locking the support member 42 to the chassis 7 and thus the housing 2 when the disk is not being played.

As shown in FIG. 2, the front end of the body 10a of the tray 10 is provided with a vertically extendable pin 101. a lever member 102 laterally extended to cover the whole length of the body 100a is attached to the pin 101, the lever member being made rotatable in the direction of arrow S at its center. A protrusion 102a is provided at the left end of the lever member 102 so that the outer periphery of the disk 5 properly positioned in the container 22 may mate therewith. Another protrusion 102b is formed at the left end of the lever member 102 and allowed to mate with the operating element of a detection switch 104 fixed to the left-hand under surface of the body 10a of the tray 10. The detection switch 104 is designed to detect the fact that the disk 5 has been placed in the fixed position of the container 22.

A protrusion 102c capable of abutting on a rising portion 7m formed at the rear end of the chassis 7 rearwardly extended (in the direction opposite to arrow Y) is formed at the right end of the lever member 102. When the tray 10 moves back to reach the rear marginal position, the protrusion 102c abuts on the rising portion 7m and causes the lever member 102 to turn counterclockwise in FIG. 2. The lever member 102 is supplied with clockwise bias force in FIG. 2 by a coil spring 105.

The right end of the lever member 102 is provided with another protrusion 102d, which mates with a detection switch 106 provided on the right under surface of the body 10a of the tray 10. The detection switch is used to detect whether the tray 10 has reached the rear marginal position.

As shown in FIG. 2, a detection switch 108 is installed on the right under surface of the body 10a of the tray 10, the detection switch being used to detect whether the moving member 14 has reached the rear marginal position as the result of which the rear end of the moving member 14 has mated therewith. On the other hand, as shown in FIG. 4, a detection switch 109 is arranged in the right front end of the chassis 7, the detection switch being used to detect whether the moving member 14 has reached the front marginal position as the result of which the moving member has mated therewith. As shown in FIG. 7, moreover, there is installed a detection switch 110 for detecting it in the fixed position of the support member 42 supporting the playback means whether or not the carriage 48 has returned to the home position, i.e., the static position prior to playback.

The signals transmitted from the above group of operating buttons 6 and the detection switches 101, 106, 109 and 110 are applied to controls (not shown) arranged in the fixed positions of the housing 2, respectively. The motors 20, 51 and the spindle motor 46 are operated at the timing as will be described later according to operating signals sent by controls according to the respective signals.

Regerring to FIGS. 22 through 28, the operating of the auto loading disk player thus constructed will briefly be described in line with the playback procedure.

FIGS. 1 through 12 show the initial state of the disk player before playback.

As shown in FIG. 1, the disk 5 is first inserted into the housing 2 through the slot 3a. However, the disk 5 is moved while being pushed against the cover (see FIG. 3) blocking the slot 3a. When the disk 5 is half inserted into the housing 5, the outer periphery of the disk mates with the front two pins out of the four pins 33a, 34a provided for the holding members 33, 34 shown in FIG. 5 while moving forth by pushing both pins laterally apart. When the center of rotation of the disk exceeds a line connecting the axes of the pins 33a, 34a, the disk 5 will automatically be inserted in the housing 2 because both pins are being energized toward the outer perphery thereof (by the coil spring 36). Moreover, the guide member 74 plays an effective role in guiding the disk 5, which is then placed in position and held by the four pins 33a, 34a. In case the disk is inserted in a slightly tilted condition, the inclination will be properly adjusted by the drum-shaped tapered portion 33d shown in FIG. 6. As set forth above, the disk 5 will not deviate from the position set once despite external vibration to a certain degree because it is held by the four pins 33a, 34a.

Simultaneously when the disk 5 is positioned relative to the container 22, the outer periphery of the disk 5 mates with the protrusion 102a of the lever member 102 shown in FIG. 2 and the lever member is swivelled counterclockwise by a fixed angle in FIG. 2. Accordingly, the detection switch 104 is actuated. Then the motor 20 starts revolution and causes the moving members 14, 13 to be driven through the worm shaft 19, etc. The container 22 has been locked to the tray 10 by the locking release means and consequently the moving members 14, 13, the tray 10 and the container 22 are allowed to move back only as the motor 20 rotates.

When the tray 10 and the container 22 moves back by a fixed distance, causing the center of rotation of the disk 5 supported by the container to coincide with the rotating shaft of the turntable 45, the locking release means operates so as to lock the tray 10 to the chassis 7 and release the container 22 from the locked state to the tray 10. Moreover, the protrusion 102d of the lever member 102 causes the detection switch 106 to operate. The moving members 14, 13 are thus continuously moved back and placed in the states shown in FIGS. 22 through 28. The operating of each part accompanied by the backward movement of the members 14, 13 will be described.

Figure 23:
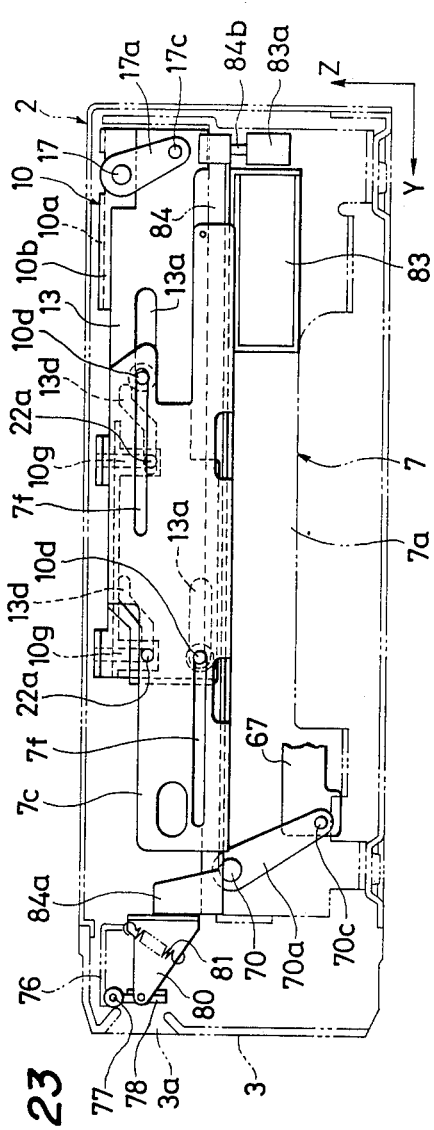
Figure 24:
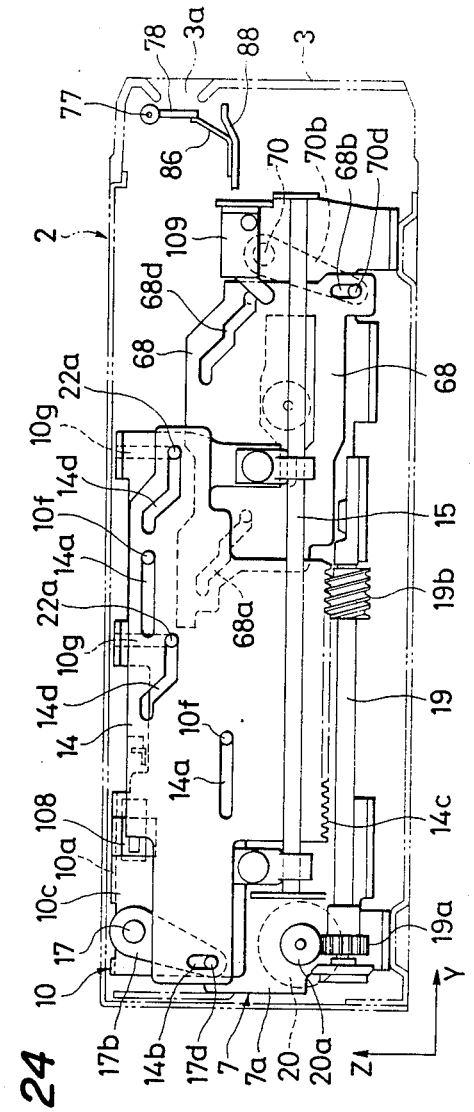
Figure 25:
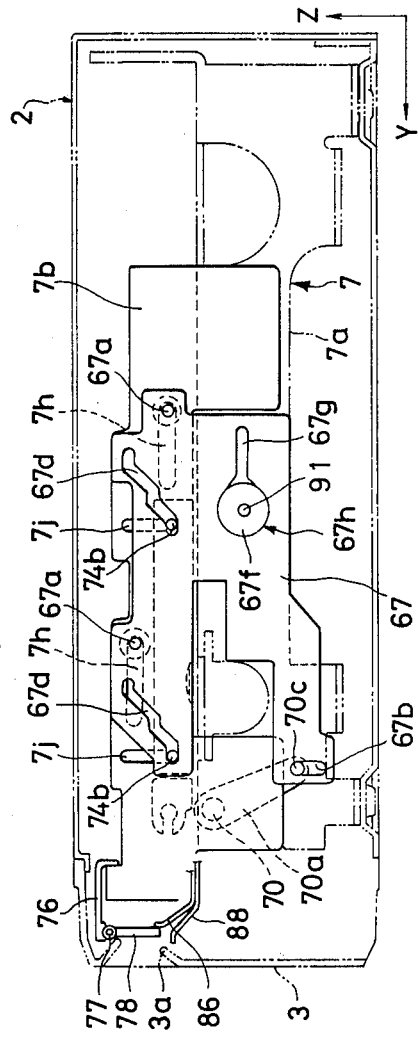
Figure 26:
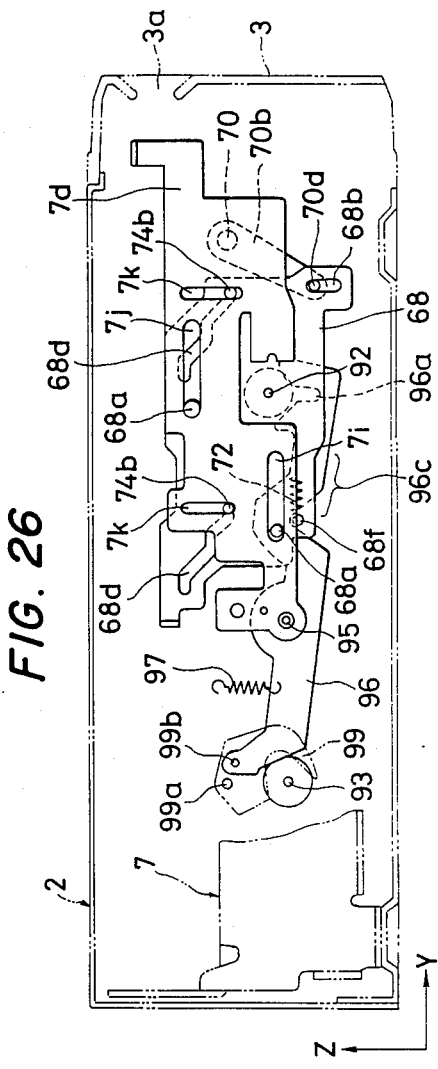
Figure 27:
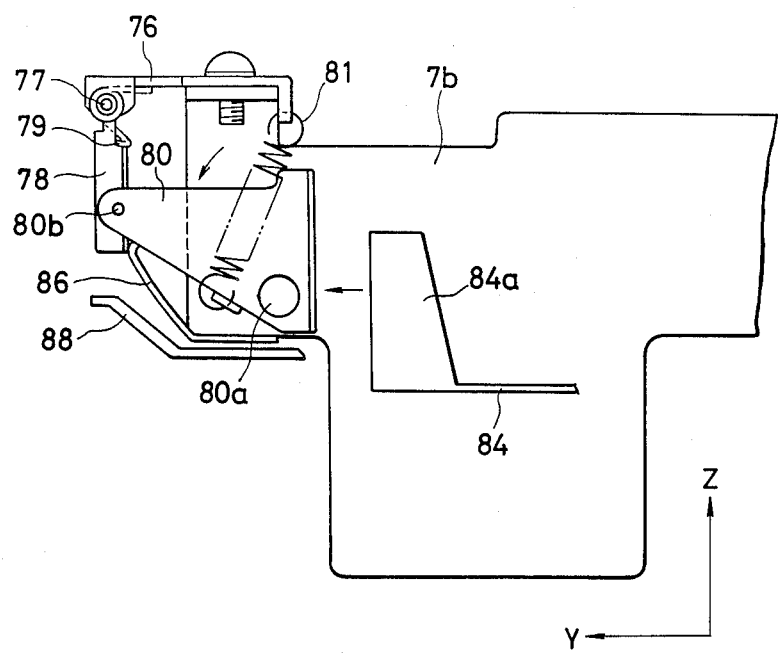

As shown in FIGS. 22 through 24, the pins 22a protruded from the both ends of the container 22 are made to slide along the cam holes 13d, 14d respectively formed in the moving members 13, 14, whereas the container 22 is moved down while it is supporting the disk. On the other hand, as shown in FIGS. 25 and 26, the moving plates 67, 68 are also driven back as the moving members 14 is moved back, whereby the guide member 74 mated with the pin 74b by the respective cam holes 67d, 68d of the respective plates also moves down. Accordingly, the member 86 for preventing disk insertion attached to the guide member 74 moves to the position shown in FIG. 25. Immediately before the movement of the member 86 for preventing disk insertion, as shown in FIG. 27, the lever member 89 has been driven forward by the solenoid plunger 83a (see FIG. 3) and the abutting portion 84a of the lever member is caused to push the swivel lever 80 from behind and swivel counterclockwise, whereby the cover 78 is put in the closing position. Accordingly, the member 86 for preventing disk insertion is so placed as to support the cover 78, whereas the cover 78 is firmly held in the closing position. Thus double disk insertion can be prevented. The solenoid plunger 83 is instantly stopped being supplied with power.

As shown in FIG. 26, the lock plate A96 is swivelled clockwise in FIG. 26 with the pin 95 as a center because of the backward movement of the moving plate 68 and the action of the coil spring 97 and counterclockwise with the pin 99a of the lock plate B99 with a center. In consequence, the chassis 7 of the lock pins 92, 93, i.e., the housing 2 is released from the locked state. On the other hand, as the other moving plate 67 shown in FIG. 25 is moved back, the lock pin 91 is released from the locked state, whereby the support member 42 (see FIG. 7) supporting the playback means including the turntable 45 is released from the locked state to the housing 22.

Figure 28:
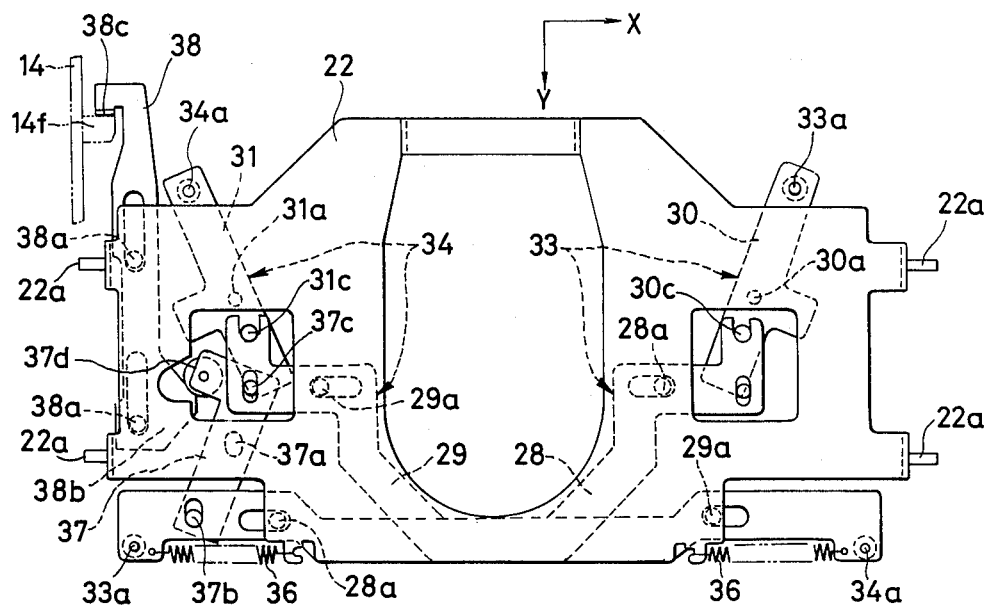

As the container 22 moves down, the disk 5 is mounted on the turntable 45. Moreover, the final operation of the moving member 14 allows the disk clamping and, as shown in FIG. 28, the pins 33a, 34a provided on the container 22 are respectively released from holding the disk 5.

When the moving member 14 has reached the rear marginal position simultaneously with the clamping of the disk 5, the neighborhood portion at the rear end of the moving member is allowed to mate with the detection switch 108 as shown in FIGS. 22 and 24 and the detection switch is operated, whereby the motor is stopped. In this state, the disk may be replayed.

Subsequently, the turntable 45 rotates and simultaneously the carriage 48 (FIG. 7) carrying the optical pickup means is driven and the performance is started.

When the carriage has reached the marginal position upon completion of the performance, the carriage 48 and the turntable 45 are stopped, whereas the motor 20 is reversely operated. Accordingly, the tray 10, the moving members 13, 14, the container 22, the moving plates 67, 68, the guide member 74, and clamp mechanism, etc. are returned to the positions prior to playback according to the reversed process of the above disk loading one. Moreover, the carriage is also returned to the home position.

The disk 5 is thus recovered.

As set forth above, the auto loding disk player according to the present invention is equipped with locking means (lock pins 91 through 93 and lock plates A96, B99) for locking the support member 42 supporting the playback means including the turntable 45 attached to the player housing through the vibration resistant mechanism (comprising the vibration resistant member 43, etc.) to the layer housing. Even if a relatively greater shock is applied to a disk player while it is being shipped, the support member will not move and will be prevented from sharply colliding with the player house. In other words, the player has a relatively wide range of vibration resistance starting with a small external vibration up to a relatively large shock.

We claim:

1. In a front loading disk player comprising a housing provided with a slot into which a disk to be played is inserted, playback means installed in said housing, a disk carrier mechanism for carrying said disk to a playback position, said disk carrier mechanism including a disk loader; said playback means comprising a carriage for supporting optical pickup means, a driving mechanism for driving said carriage, a turntable, a support member for supporting said carriage, said driving mechanism and said turntable, a vibration-damping mechanism securing said support member to said housing, the improvement comprising locking means for locking said support member to said housing when the disk is not being played, said locking means including at least one lock pin mounted on opposite sides of said support member and operatively engaging said housing to prevent inclination of said support member upon release of said locking means, and wherein said housing further includes a chassis, moving plates mounted on opposite sides for movement longitudinally towards and away from said slot, and for raising and lowering said support member, said locking pins comprise two locking pins fixedly mounted on one side of said support member and one locking pin fixedly mounted on the opposite side of said support member, said locking pins projecting transversely from said opposite sides of said support member, one of said moving plates including an elongated horizontal opening therein, said horizontal opening including a narrow, straight portion at one end and a radially enlarged portion at the other end, said one locking pin having a projecting portion received within said horizontal opening and movable relative therewith, such that said support member is locked via said one pin when said projecting portion thereof is in the narrow portion of said opening, and said support member is unlocked when said moving plate is shifted relative to said support member such that said projecting portion of said one locking pin enters said radially enlarged portion of said opening.

2. The front loading disk player as claimed in claim 1, wherein said chassis pivotably mounts a lock plate intermediate of its ends, in a position such that the lock plate extends parallel to said chassis and to said other moving plate, a coil spring is coupled between said chassis and said lock plate and biases said lock plate in one direction, a cut is formed in an end of the lock plate proximate to said slot, said cut receiving a first locking pin mounted to said one side of said support member proximate to said slot, a crescent shaped lock plate is pivotably mounted to said chassis at the end of said lock plate remote from said slot and being engagable with a second locking pin fixably mounted to said one side of said support member, to the side of said first locking pin remote from said slot and positionable within said crescent lock plate, a cam is formed within the edge of the lock plate and a pin is fixably mounted to the moving plate and slidably matable with said cam such that said lock plate is rotated against the bias of said coil spring during movement of said moving plate in the direction towards said slot, thereby locking said support member carried locking pins to said chassis fixed to said housing during rise of said support member and when the disk is not being played.

* * * * *